United States Patent
Habuta et al.

(10) Patent No.: US 8,003,188 B2
(45) Date of Patent: Aug. 23, 2011

(54) INFORMATION RECORDING MEDIUM AND METHOD FOR PRODUCTION THEREOF

(75) Inventors: Haruhiko Habuta, Osaka (JP); Noboru Yamada, Osaka (JP); Morio Tomiyama, Nara (JP)

(73) Assignee: Panasonic Corporation, Osaka (JP)

( * ) Notice: Subject to any disclaimer, the term of this patent is extended or adjusted under 35 U.S.C. 154(b) by 361 days.

(21) Appl. No.: 12/297,777

(22) PCT Filed: Apr. 23, 2007

(86) PCT No.: PCT/JP2007/058769
§ 371 (c)(1),
(2), (4) Date: Oct. 20, 2008

(87) PCT Pub. No.: WO2007/123230
PCT Pub. Date: Nov. 1, 2007

(65) Prior Publication Data
US 2009/0239022 A1     Sep. 24, 2009

(30) Foreign Application Priority Data

Apr. 24, 2006   (JP) .................................. 2006-118884

(51) Int. Cl.
*B32B 3/02* (2006.01)
(52) U.S. Cl. ..................... 428/64.1; 428/64.4; 428/64.5; 430/270.13
(58) Field of Classification Search ............... 428/64.4, 428/64.5; 430/270.13
See application file for complete search history.

(56) References Cited

U.S. PATENT DOCUMENTS

| | | | |
|---|---|---|---|
| 6,229,785 B1 | 5/2001 | Kitaura et al. | |
| 7,057,252 B2* | 6/2006 | Uno et al. | 257/432 |
| 2002/0022105 A1 | 2/2002 | Kitaura et al. | |
| 2004/0253539 A1* | 12/2004 | Uno et al. | 430/270.13 |
| 2005/0082162 A1* | 4/2005 | Uno et al. | 204/192.26 |
| 2006/0072439 A1 | 4/2006 | Kitaura et al. | |

FOREIGN PATENT DOCUMENTS

| | | |
|---|---|---|
| JP | 50-046317 A | 4/1975 |
| JP | 58-054338 A | 3/1983 |
| JP | 62-086553 A | 4/1987 |
| JP | 9-326135 A | 12/1997 |
| JP | 2002-133712 A | 5/2002 |
| WO | WO 98/09823 A1 | 3/1998 |
| WO | WO 2004/032130 A1 | 4/2004 |

* cited by examiner

*Primary Examiner* — Elizabeth Mulvaney
(74) *Attorney, Agent, or Firm* — Hamre, Schumann, Mueller & Larson, P.C.

(57) ABSTRACT

The information recording medium of the present invention is provided with a substrate and an information layer including a recording layer. Rerecording and reproducing of information are performed by irradiating the information layer with a laser beam. The recording layer contains, as its main component, a material composed of Te, O, and M, where M denotes at least one element selected from Ru, Rh, Pd, Ag, Re, Os, Ir, Pt, and Au. In the material, the content of Te atom is 1 to 19 atom %, the content of O atom is 20 to 70 atom % (preferably 40 to 70 atom %), the content of M atom is 11 to 79 atom % (preferably 11 to 59 atom %, and more preferably more than 35 atom %). The material is, for example, is indicated as the region enclosed by A, B, C, and D, preferably by C, D, E, and F, and more preferably by E, F, H, and G, in the composition diagram of a ternary material of Te—O—Pd shown in FIG. 1.

6 Claims, 6 Drawing Sheets

INFORMATION RECORDING MEDIUM AND METHOD FOR PRODUCTION THEREOF

TECHNICAL FIELD

The present invention relates to a write-once information recording medium on which information is recorded by being irradiated with a laser beam so that a recording layer thereof is changed optically.

BACKGROUND ART

Information recording media are known as a medium on and from which information can be recorded and reproduced at high capacity and high speed. Recording is performed utilizing the fact that a recording material is changed to have a different, optically-distinguishable state by the heat generated when the recording material is irradiated locally with a laser beam. Such information recording media can be accessed by random access, if needed, and also have excellent portability. With these great advantages, the information recording media further have grown in importance recently. For example, the demand is increasing in various situations, such as recording or storing of personal data and image information via computers, medical and academic fields, and replacing of home videotape recorders.

Today, phase-change optical media are needed to attain higher capacity, higher density and higher speed in accordance with improved performances of applications and image information.

Types of media that conventionally have been proposed include rewritable media capable of being written multiple times, and write-once media capable of being written only one time. Generally, since the write-once media can be provided with fewer layers compared with the rewritable media in many cases, they easily can be produced at low cost. Furthermore, since the write-once media are not rewritable, they are convenient for users when writing data that they do not want to destroy. For this reason, write-once media having a long storage life and a high reliability are in a great demand to be used for an archival purpose.

Some oxide materials are proposed as the write-once recording material. One of them is, for example, a recording material that includes TeOx (0<x<2), which is a mixture of Te and $TeO_2$, as its main component (see JP50 (1975)-46317A). In the case of using the TeOx recording material, there was a problem that it took some time to obtain a state where the signals can be detected after being recorded. It has been reported, however, that the addition of an additive material such as Pd can deal with the problem (see JP58 (1983)-54338A). A recording mechanism of a Te—O—Pd recording material is conceived to be as follows. A Te—O—Pd film after having been formed is a composite material, wherein Te—Pd, Te, and/or Pd is uniformly dispersed in $TeO_2$ as fine particles. After laser beam irradiation, the composite material is melted and Te, Te—Pd, and Pd are deposited as larger crystal particles, changing the optical state of the composite material. The difference between the optical states before and after the change can be detected as a signal. The recording mechanism possibly changes as the composition varies.

On the other hand, in recent years, a further improvement has been needed in the information recording media to have a higher recording density in response to the increasing volume of information. Therefore, it is necessary to develop a medium applicable for high density recording utilizing an optical system of a shorter wavelength and a higher numerical aperture (a higher NA), particularly, a blue-violet laser beam.

In order to use the above-mentioned Te—O—Pd recording material in a blue-violet wavelength region, it has been proposed to increase the reflectance difference between a recorded region and an unrecorded region in an information layer by providing a dielectric layer adjacent to a recording layer (see JP2002-133712A).

In order to improve recording density further, multilayer information recording media have been proposed in which information can be recorded on a plurality of information layers. In such media, when recording data on an information layer disposed farther from the beam incident side, the laser beam needs to transverse information layer(s) disposed closer to the beam incident side. Therefore, the information layer(s) closer to the beam incident side has to ensure satisfactory signal quality while maintaining a high transmittance with respect to the laser beam. Since the material containing Te—O—Pd as its main component contains almost transparent $TeO_2$ as a base material, it easily can increase the transmittance of the film. The material thus can be used as the recording material of multilayer optical information media in which information can be recorded on multiple of information layers by a laser beam incident from one side.

In an attempt of realizing a multilayer information recording medium including two or more information layers, recording and reproducing of information on and from an information layer located farther from the laser beam incident side may be affected by the information layer(s) located closer to the laser beam incident side.

That is, when the transmittance of the closer information layer(s) differs depending on the presence of a record, the amount of the laser beam to reach the information layer located farther varies depending on whether the closer information layer(s) is recorded or unrecorded. Therefore, it becomes difficult for the laser beam having been transmitted through the closer information layer(s) to record or reproduce accurately signals on or from the information layer located farther. This problem becomes more serious when a larger number of information layers are stacked. As an approach to solve such a problem, it has been proposed to minimize the transmittance difference by adjusting the material and thickness of the dielectric layers included in the information layers. However, there has been a problem that in write-once information recording media using a Te—O—Pd recording material, the transmittance difference cannot be made small enough only by adjusting the material and thickness of the dielectric layers included in the information layers.

In the write-once information recording medium described in JP2002-133712A using a Te—O—Pd recording material, in which a change from an amorphous state to a crystalline state is used as a recording principle, it is necessary to provide a dielectric layer on both sides of a recording layer, and to form a reflective layer on a side opposite to the laser beam incident side with respect to a recording layer so that the variation in reflectance shifts from high level to low level. Furthermore, this information recording medium successfully has realized satisfactory signal quality by having a structure in which the dielectric layers and the reflective layer are included in an information layer. At the same time, there has been a problem that one information layer needs to include at least four layers, leading to an increased production cost. This problem also becomes more serious when a larger number of information layers are stacked.

From the foregoing, in order to realize a multilayer information recording medium capable of accurate recording and reproducing of signals, an information recording medium strongly has been desired whose information layer closer to the beam incident side has a smaller transmittance difference and whose production cost is low.

DISCLOSURE OF INVENTION

The present invention is intended to provide an information recording medium and a method for production thereof that enable the transmittance difference between a recorded region and an unrecorded region of an information layer to be reduced while allowing the production cost to be reduced.

The information recording medium of the present invention is provided with a substrate and an information layer including a recording layer. Recording and reproducing of information are performed by irradiating the information layer with a laser beam. The recording layer contains, as its main component, a material composed of Te, O, and M. In the material, the content of Te atom is 1 to 19 atom %, the content of O atom is 20 to 70 atom %, and the content of M atom is 11 to 79 atom %. Here, M denotes at least one element selected from Ru, Rh, Pd, Ag, Re, Os, Ir, Pt, and Au. The same applies to M that is described below. In this description, "to contain, as its main component, a material composed of Te, O and M" indicates that when the sum total of all the atoms contained in the recording layer is taken as 100 atom %, the sum total of Te, O and M atoms is at least 70 atom %, preferably at least 85 atom %.

The method for producing the information recording medium of the present invention is a method for producing the above-mentioned information recording medium of the present invention. The method includes the step of forming the information layer. In the step, the recording layer is formed by a thin film vapor-phase deposition method.

The information recording medium of the present invention and the method for production thereof enable the transmittance difference between a recorded region and an unrecorded region of an information layer to be reduced while allowing the production cost to be reduced. Therefore, the present invention can provide a multilayer information recording medium that is less expensive and capable of accurate recording and reproducing.

BEST MODE FOR CARRYING OUT THE INVENTION

Figure 1:
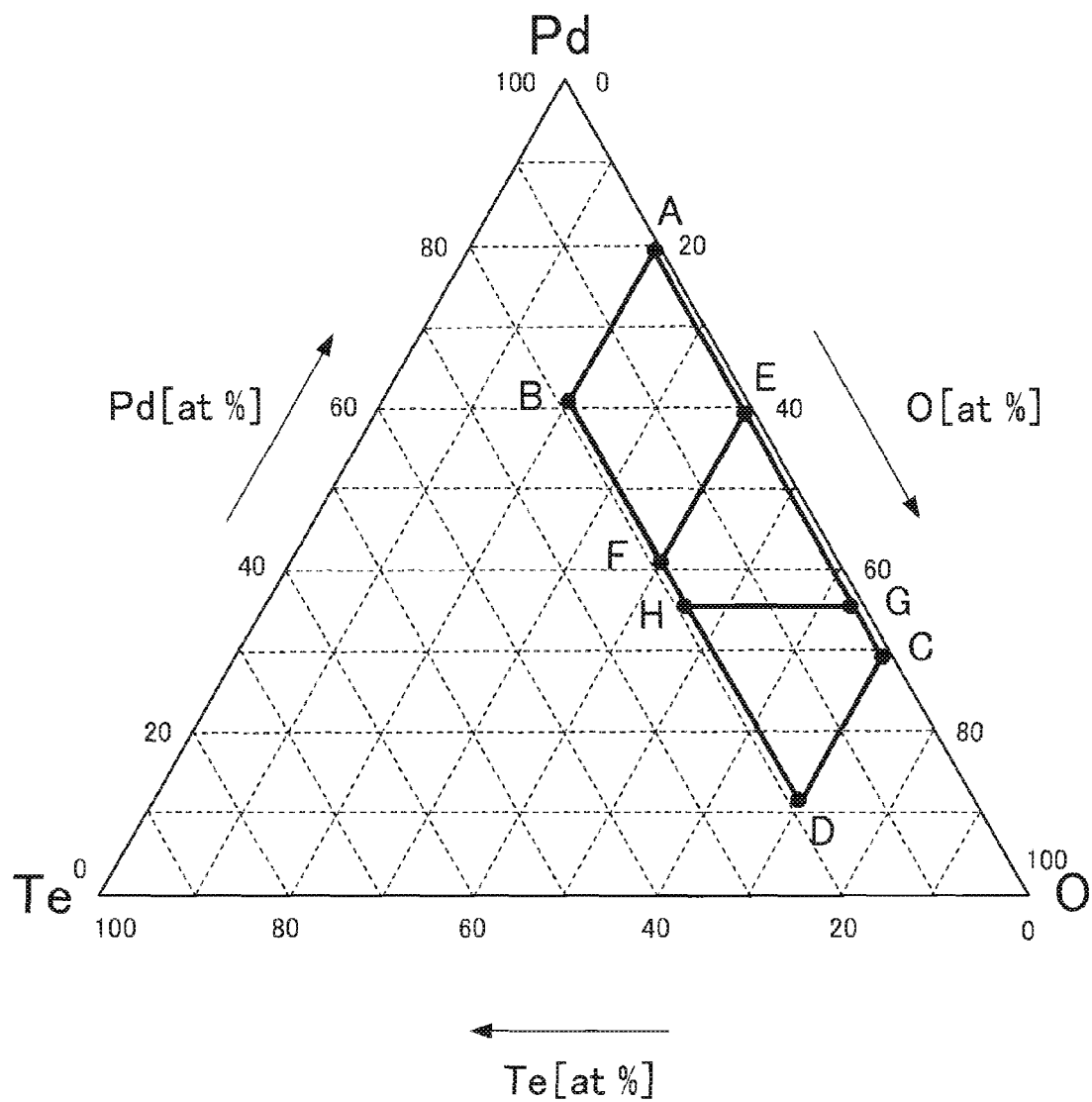
FIG. 1 is a diagram showing a composition range of Te—O—Pd that is an example of the recording material to be used for the recording layer of the information recording medium of the present invention.

The recording layer included in the information layers provided in the information recording medium of the present invention contains, as its main component, a material composed of Te, O, and M, as mentioned above. M is one or a plurality of elements selected from Ru, Rh, Pd, Ag, Re, Os, Ir, Pt, and Au as mentioned above. In the material, the content of Te atom is 1 to 19 atom %, the content of O atom is 20 to 70 atom %, and the content of M atom is 11 to 79 atom %. By forming the recording layers using such a material, it is possible to simultaneously realize a reduction of the transmittance difference between a recorded region and an unrecorded region in the information layers and a reduction of the production cost. Hereinafter, in this description, the material used for the recording layers may be called the "Te—O-M material in the present invention."

In order to reduce further the transmittance difference between a recorded region and an unrecorded region in the information layers, it is preferable, for example, to set the content of Te atom to 1 to 19 atom %, the content of O atom to 40 to 70 atom %, and the content of M atom to 11 to 59 atom % in the material composed of Te, O and M used for the recording layers. In order to realize simultaneously a sufficient reduction of the transmittance difference between a recorded region and an unrecorded region in the information layers and excellent signal quality (a satisfactory C/N ratio, for example), it is more preferable that the content of M atom exceeds 35 atom %.

In order to improve the signal quality, it is possible, for example, to use a structure that further includes at least one dielectric layer disposed adjacent to the recording layer, and that further includes a reflective layer disposed on a side opposite to the laser beam incident side with respect to the recording layer. It is also possible to set the thickness of the recording layers within a range of 3 nm to 200 nm to improve the signal quality.

The information recording medium of the present invention may be a multilayer information recording medium in which a plurality of information layers are stacked. In this case, a first information layer to the n-th information layer (where n is an integer of at least 2) are stacked on a substrate in this order with separation layers interposed therebetween, and at least one selected from the first information layer to the n-th information layer includes the recording layer. That is, at least one of the first information layer to the n-th information layer is provided with the recording layer including the above-mentioned Te—O-M material in the present invention. According to such a structure, a multilayer information recording medium capable of accurate recording and reproducing of information can be realized at a low production cost.

As long as the information recording medium of the present invention is provided with the substrate and the information layer, and furthermore, as long as the information layer includes at least the recording layer and the recording layer contains, as its main component, the above-described material composed of Te—O-M, the layer structure of the information layer is not particularly limited.

Hereinafter, embodiments of the information recording medium of the present invention and the method for production thereof are described with reference to the drawings. The embodiments described below are an example and the present invention is not limited to the following embodiments. In the following embodiments, the same members are designated by the same reference numerals and repetitive description thereof may be omitted.

FIG. 1 is a diagram for describing an example of the Te—O-M material used for the recording layer of the information recording medium of the present invention. Although details will be described later, FIG. 1 is a composition diagram of a ternary composition of Te—O—Pd, showing composition ranges of the recording material used for the information recording medium of the present invention.

FIG. 2, FIG. 3, FIG. 4, and FIG. 5 respectively show a structural example of the information recording medium of the present invention.

Figure 2:
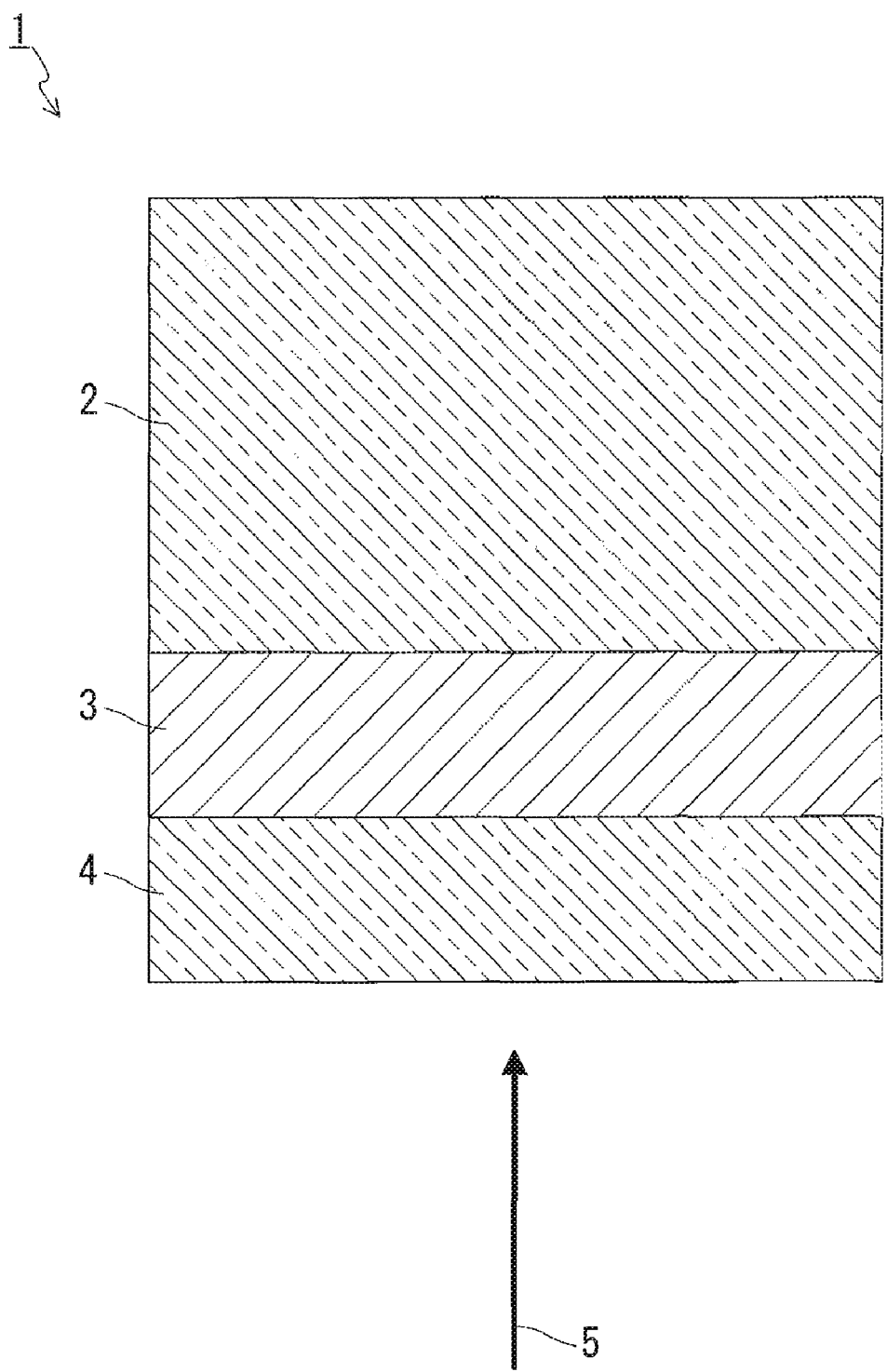
FIG. 2 is a cross-sectional view showing a structural example of the information recording medium of the present invention.
Figure 3:
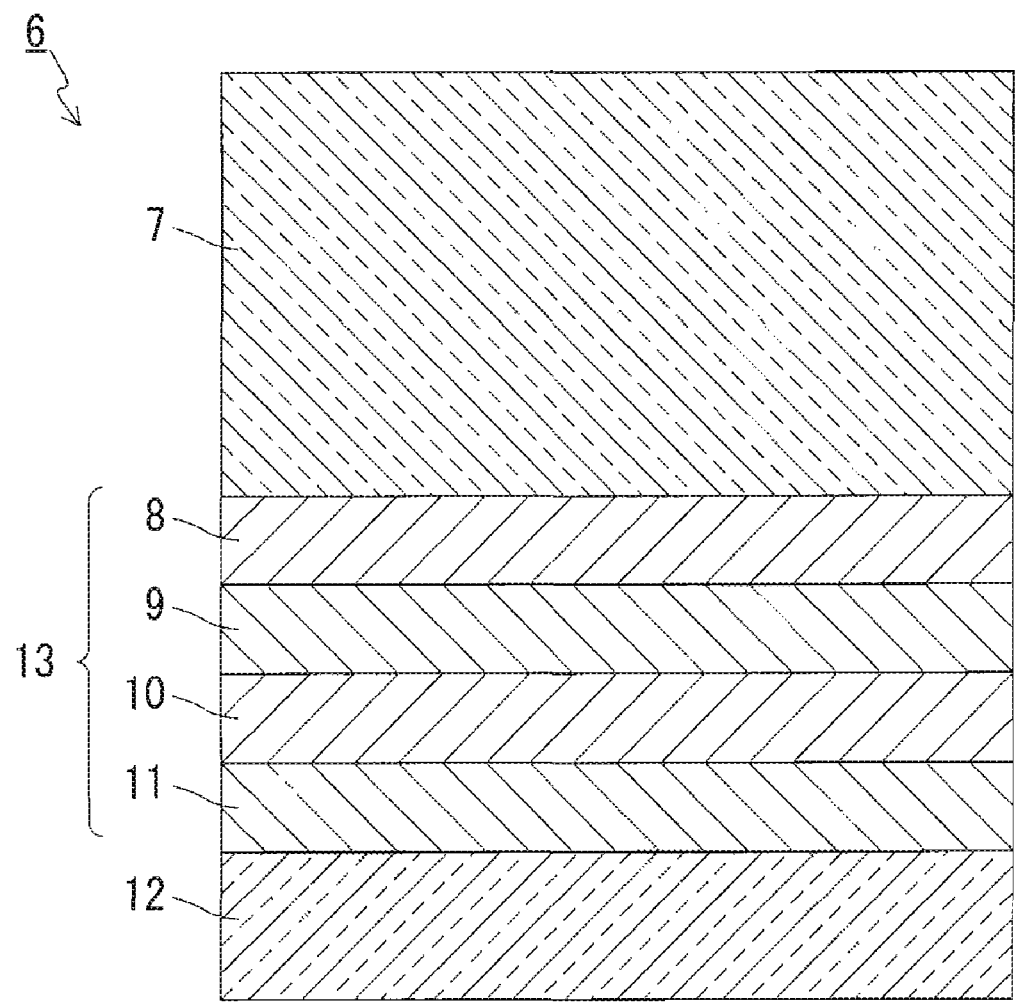
FIG. 3 is a cross-sectional view showing another structural example of the information recording medium of the present invention.

An information recording medium 1 shown in FIG. 2 is provided with an information layer composed of a recording layer 3, the information layer being formed on a substrate 2. An optically transparent layer 4 further is provided on the information layer. A dielectric layer may be interposed suitably between the recording layer 3 and the optically transparent layer 4 and/or between the recording layer 3 and the substrate 2, and furthermore, a reflective layer composed of an alloy material or the like may be interposed, in order to adjust optical properties so that an effective optical absorption can be obtained in the information layer. FIG. 3 shows an example of the information recording medium provided with such dielectric layers and a reflective layer. An information recording medium 6 shown in FIG. 3 is provided with an information layer 13 including a recording layer 10, the information layer 13 being formed on a substrate 7. The information layer 13 is provided with a first dielectric layer 9 and a second dielectric layer 11 both disposed adjacent to the recording layer 10, and with a reflective layer 8 disposed on a side opposite to the laser beam incident side with respect to the recording layer 10. In other words, the information layer 13 provided in the information recording medium 6 is formed of the recording layer 10, the first dielectric layer 9, the second dielectric layer 11, and the reflective layer 8. Recording and reproducing of information are performed by applying a laser beam 5 to the information layers of these information recording media 1 and 6 from a side of the optically transparent layer 4 and a side of an optically transparent layer 12 respectively.

Figure 4:
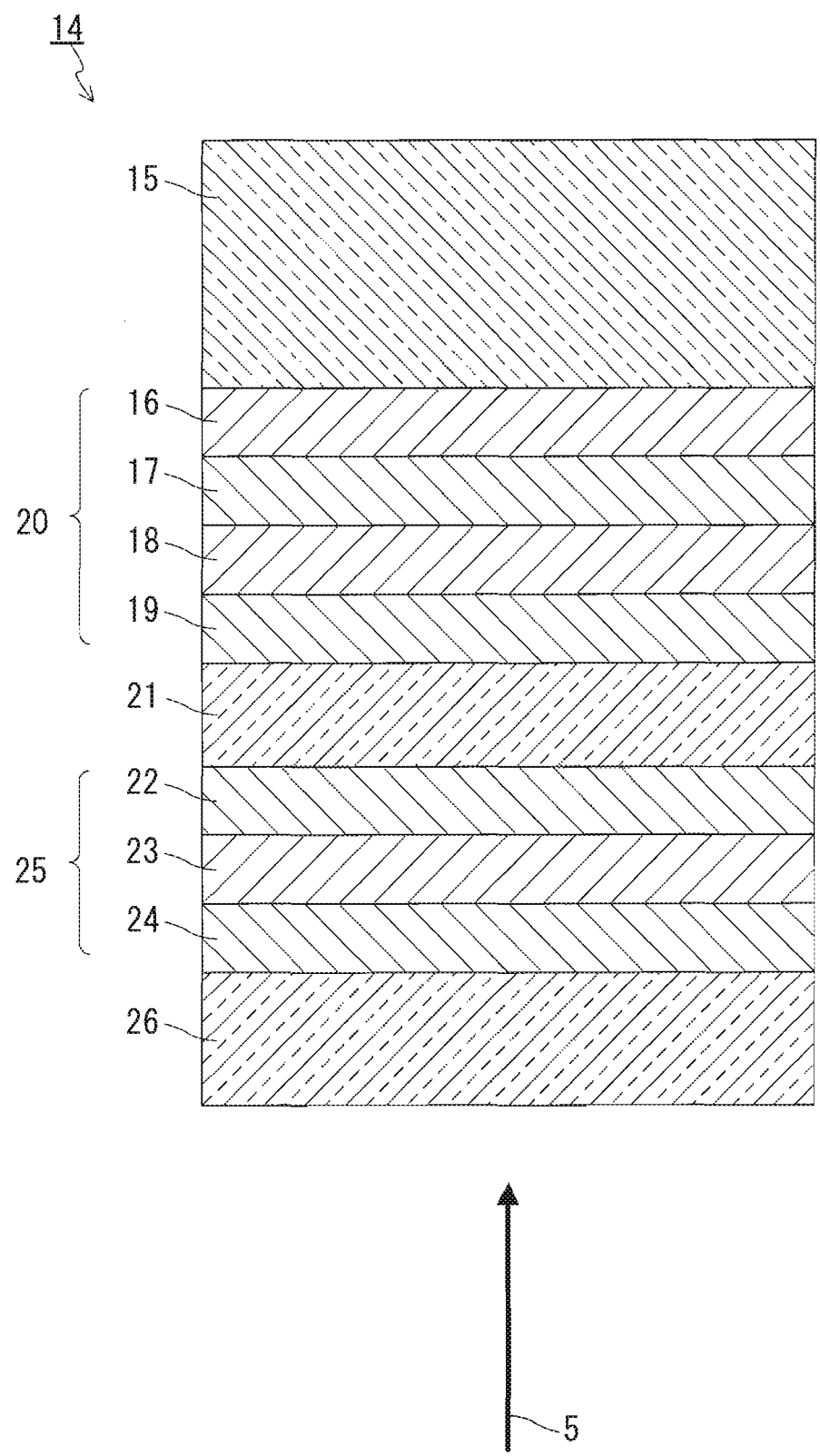
FIG. 4 is a cross-sectional view showing still another structural example of the information recording medium of the present invention.

In an information recording medium 14 shown in FIG. 4, two information layers are stacked with an interlayer 21 interposed therebetween, the interlayer 21 serving as a separation layer. That is, the information recording medium 14 is the multilayer information recording medium including n information layers mentioned above as an example of the present invention, where n=2. In the information recording medium 14, a first information layer 20, a second information layer 25, and an optically transparent layer 26 are formed in this order on a substrate 15. The interlayer 21 interposed between the first information layer 20 and the second information layer 25 optically separates the first information layer 20 from the second information layer 25 so as to eliminate unnecessary optical interference therebetween. Recording and reproducing of information are performed by applying the laser beam 5 to the information recording medium 14 from a side of the optically transparent layer 26. The first information layer 20 has a structure in which a reflective layer 16, a first dielectric layer 17, a recording layer 18, and a second dielectric layer 19 are stacked sequentially so as to attain simultaneously high reflectance and high signal quality. The second information layer 25 has a structure in which a first dielectric layer 22, a recording layer 23, and a second dielectric layer 24 are stacked sequentially so as to attain simultaneously high transmittance and high signal quality. Another reflective layer composed of an alloy material or the like further can be provided in the second information layer 25, the reflective layer being disposed on a side opposite to the laser beam incident side with respect to the recording layer, specifically, being disposed between the first dielectric layer 22 and the interlayer 21. It is also possible to eliminate each dielectric layer from the second information layer 25.

Figure 5:
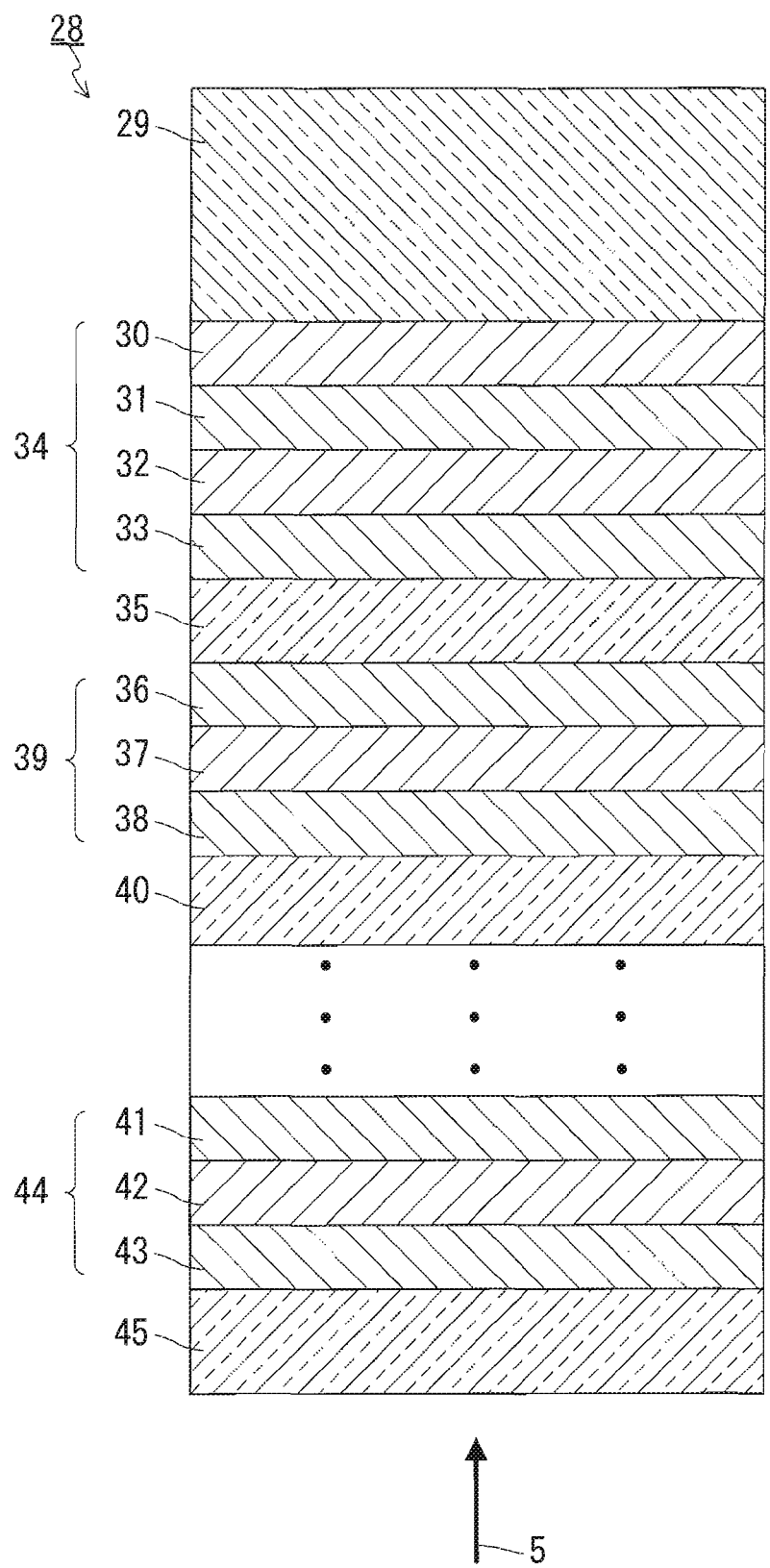
FIG. 5 is a cross-sectional view showing still another structural example of the information recording medium of the present invention.

An information recording medium 28 shown in FIG. 5 has a structure in which n information layers, that is, a first information layer 34, a second information layer 39, . . . , an n-th information layer 44, are stacked in this order on a substrate 29. In the example shown in FIG. 5, n denotes an integer of at least 3. Interlayers 35, 40 . . . interposed between each of the information layers optically separate the information layers from each other so as to eliminate unnecessary optical interference therebetween. Recording and reproducing of information are performed by applying the laser beam 5 to the information recording media 28 from a side of an optically transparent layer 45. The first information layer 34 has a structure in which a reflective layer 30, a first dielectric layer 31, a recording layer 32, and a second dielectric layer 33 are stacked sequentially so as to attain simultaneously high reflectance and high signal quality. Each information layer from the second information layer 39 to the n-th information layer 44 is formed of a first dielectric layer, a recording layer, and a second dielectric layer so as to attain simultaneously high transmittance and high signal quality. For example, the second information layer 39 is formed of a first dielectric layer 36, a recording layer 37, and a second dielectric layer 38, and the n-th information layer 44 (where n>=3) is formed of a first dielectric layer 41, a recording layer 42, and a second dielectric layer 43. A reflective layer composed of an alloy material or the like can be provided in each information layer from the second information layer 39 to the n-th information layer 44, the reflective layer being disposed on a side opposite to the laser beam incident side with respect to the recording layer, specifically, being disposed between the first dielectric layer and the interlayer. It is also possible to eliminate each dielectric layer from the information layers from the second information layer 39 to the n-th information layer 44.

When a plurality of information layers are provided in the information recording medium of the present invention, at least one of them includes a recording layer containing the Te—O-M material in the present invention as its main component. Another information layer that does not include a recording layer containing such a material further may be provided. For example, instead of a write-once information layer, a rewritable or a reproduction-only information layer may be added in an arbitrary position.

The information layers may be formed on one side of the substrate, or may be formed on two sides, that is, on a front side and a back side. In the latter case, one or a plurality of information layers are formed on a substrate to obtain a media, and two of such media are bonded together with the substrates being opposed to each other so as to have a double-sided structure. Accordingly, it is possible to increase the amount of information that one medium can store.

Examples of the material of substrates 2, 7, 15, and 29 (hereafter, described simply as the substrates) shown in FIG. 2 to FIG. 5 include transparent polycarbonate resins, polymethyl methacrylate resins, polyolefin resins, norbornene resins, ultraviolet curable resins, and glass. Or these materials suitably can be used in combination. The thickness of the substrates is not particularly limited, but approximately 0.01 to 1.5 mm is preferable. The shape thereof is not particularly limited either, but a disc-like shape is preferable.

Preferably, the material of optically transparent layers 4, 12, 26, and 45 (hereafter, described simply as optically transparent layers) shown in FIG. 2 to FIG. 5 has low optical absorption with respect to the wavelength of the laser beam to be used, and has low optical birefringence in a short wavelength region. Transparent polycarbonate resins, polymethyl methacrylate resins, polyolefin resins, norbornene resins, ultraviolet curable resins, glass, or these in combination can be used as appropriate. The thickness of the optically transparent layers is not particularly limited, but a thickness of approximately 0.01 to 1.5 mm can be used. The shape thereof is not particularly limited either, but a disc-like shape can be used.

When the numerical aperture of an object lens used for recording and reproducing is 0.75 to 0.95, the thickness of the substrates is preferably in a range of 1.00 to 1.20 mm in order to maintain the strength at the time of producing the information recording media, and the thickness of the optically transparent layers is preferably in a range of 0.03 mm to 0.20 mm in order to narrow an allowance tilt range.

On the other hand, when the numerical aperture of the object lens is 0.55 to 0.75, the thickness of the substrates is preferably in a range of 0.50 to 0.70 mm, and the thickness of the optically transparent layers is preferably in a range of 0.50 mm to 0.70 mm.

As the material of interlayers 21, 35, and 40 (hereafter, described simply as the interlayers) shown in FIG. 2 to FIG. 5, the same material as that of the substrates can be used. The thickness of the interlayers needs to be equal to or more than a focal depth determined by the numerical aperture of the object lens and wavelength λ of the laser beam so that the cross talk between the first information layer 20 and the second information layer 25 is decreased in case of the information recording medium 14 shown in FIG. 4, and so that the cross talk from the other information layers is decreased when information is reproduced from any one of the first to the n-th information layers in case of the information recording medium shown in FIG. 5. When a recording/reproducing pickup head is designed so as to exhibit a minimum aberration when used with a specific thickness t, it is also necessary for all the information layers to have a thickness falling within a specific range so that the influence to be given to the signal quality is within an allowable range during recording and reproducing. When three or more of the information layers are stacked, each interlayer preferably has a different thickness. This is because when the interlayers have the same thickness, the information layers are disposed at equal intervals. In the case where an (n−2)th information layer (an n−2th information layer) exists when recording and reproducing are performed with respect to the n-th information layer, when counted from the laser beam incident side (the n-th information layer), another focus different from that of the n-th information layer also is formed on the (n−2)th information layer, and the information on the (n−2)th information layer influences the information on the n-th information layer as a noise.

Preferably, guide grooves or pits for guiding the laser beam are formed on at least one of the substrate, the optically transparent layer, and the interlayers, on a side where the information layer is located.

The recording layers 3 and 10 shown in FIG. 2 and FIG. 3 are composed of a material that can be in two or more states having different optical properties. Preferably, the material of the recording layers 3 and 10 is a material whose state can be changed irreversibly from one to another among the different states. In light of this, the Te—O-M material in the present invention is used, the material being composed of Te, O, and M, and satisfying a composition range such that the content of Te atom is 1 to 19 atom %, the content of O atom is 20 to 70 atom %, and the content of M atom is 11 to 79 atom %. In the example of Te—O—Pd shown in FIG. 1, this composition range corresponds to a region enclosed by A, B, C, and D. In information layers provided with a recording layer containing, as its main component, a material that satisfies this composition range, the transmittance difference between a recorded region and unrecorded region can be reduced, and also the number of layers forming the information layer can be reduced, leading to a lower production cost.

At least one of the recording layers 18 and 23 of the multilayer information recording medium 14 shown in FIG. 4 contains the Te—O-M material in the present invention as its main component. Likewise, at least one of the recording layers 32, 37, and 42 of the information recording medium 28 shown in FIG. 5 also contains the Te—O-M material in the present invention as its main component.

In the Te—O-M material in the present invention, the content of O atom is approximately 20 to 70 atom % from the viewpoint of ensuring the transmittance while maintaining the heat conductivity of the recording layers within an appropriate range. Furthermore, from the viewpoint of ensuring a sufficient variation in the optical properties under laser beam irradiation and obtaining an appropriate C/N ratio, 1 to 19 atom % of Te atom, and further 11 to 79 atom % of M atom are included.

Preferably, the Te—O-M material in the present invention has a composition range such that the content of Te atom is 1 to 19 atom %, the content of O atom is 40 to 70 atom %, and the content of M atom is 11 to 59 atom %. In the example of Te—O—Pd shown in FIG. 1, the composition range corresponds to a region enclosed by C, D, E, and F. Thereby, it is possible to realize an information recording medium that can further reduce the transmittance difference between a recorded region and an unrecorded region. Furthermore, in order to realize simultaneously a reduction of the transmittance difference between a recorded region and an unrecorded region in the information layer and satisfactory signal quality (a satisfactory C/N ratio, for example), it is preferable, for example, that the content of M atom exceeds 35 atom %. In the example of Te—O—Pd shown in FIG. 1, this composition range corresponds to a region enclosed by E, F, G, and H (excluding line G-H).

The recording layers may be formed only from the Te—O-M material in the present invention, or may include elements other than Te, O, and M. For example, with the aim of adjusting the heat conductivity and optical constant, and of improving heat-resisting property and environmental reliability, etc., at least one element selected from S, N, F, B, and C may be added. The sum total of these additive elements is preferably no more than 20 atom % of the entire recording layer.

As the element M, one or a plurality of elements selected from Ru, Rh, Pd, Ag, Re, Os, Ir, Pt, and Au can be considered. Particularly, satisfactory signal quality can be obtained when Pd is selected as the element M. Even when other elements are selected, satisfactory signal quality also can be ensured.

The thickness of the recording layers is preferably 3 nm or more and 200 nm or less. Setting the thickness in such a range makes it easy to obtain a sufficient C/N ratio as a recording/reproducing property, while preventing the C/N ratio from being lowered in high density recording by adjusting thermal diffusion within the thin film plane of the recording layer to an appropriate value. Particularly, in order to obtain sufficiently high reflectance and sufficiently large variation in reflectance, and to raise the C/N ratio, the thickness is preferably 3 nm or more and 50 nm or less.

A main purpose of providing the first dielectric layers 9, 17, 22, 31, 36, and 41 (hereafter, described simply as the first dielectric layers) shown in FIG. 3 to FIG. 5, and the second dielectric layers 11, 19, 24, 33, 38, and 43 (hereafter, described simply as the dielectric layers) is to protect the recording material and to adjust optical properties including to enable effective optical absorption in the information layers.

As the material of the first dielectric layers and the second dielectric layers, sulfides, such as ZnS, selenides such as ZnSe, oxides such as Si—O, Al—O, Ti—O, Ta—O, Zr—O, and Cr—O, nitrides such as Ge—N, Cr—N, Si—N, Al—N, Nb—N, Mo—N, Ti—N, Zr—N, and Ta—N, oxynitrides such as Ge—O—N, Cr—O—N, Si—O—N, Al—O—N, Nb—O—N, Mo—O—N, Ti—O—N, Zr—O—N, and Ta—O—N, carbides such as Ge—C, Cr—C, Si—C, Al—C, Ti—C, Zr—C, and Ta—C, fluorides such as Si—F, Al—F, Ca—F, and La—F, or an appropriate combination of these materials (for example, ZnS—$SiO_2$) is used. The thickness of the first dielectric layers is preferably 1 nm or more and 60 nm or less. This is because a thickness in such a range makes it easy to obtain a sufficient C/N ratio as a recording/reproducing property.

The reflective layers 8, 16, and 30 (hereafter, described simply as the reflective layers) shown in FIG. 3 to FIG. 5 preferably are provided in order to obtain a heat radiating effect and optical effects, such as effective optical absorption in the recording layers. The reflective layers can be formed from metal, such as Au, Ag, Cu, Al, Ni, Cr, and Ti, or an alloy of suitably selected metals. The thickness thereof is preferably 1 nm or more. This is to make the film a uniform layer to ensure thermal and optical effects. Although the information recording media shown in FIGS. 3 to 5 have the reflective layer, they need not have the reflective layer. Although only the first information layer 20 has the reflective layer 16 in FIG. 4, the second information layer 25 may have the reflective layer, and the first information layer 20 may not have the reflective layer 16. Generally, the reflective layers reduce the transmittance of the information layers, but they make it easy to obtain high signal quality by the above-mentioned heat radiating and optical effects. Therefore, with regard to the information layer located on the laser beam incident side (the second information layer 25 in case of the embodiment shown in FIG. 4), it is necessary to investigate appropriately whether the reflective layer should be provided therein. And when it is provided, a thin film with a thickness of 10 nm or less is used to serve as the reflective layer so that the high transmittance of the information layer is maintained.

As an example of the method for producing the information recording medium of the present invention, a method can be mentioned that forms the recording layers containing, as their main component, the Te—O—M material in the present invention, using a thin film vapor-phase deposition method in the process of forming the information layers. Moreover, each of the above-mentioned thin films constituting the information recording medium of the present invention also can be formed by the thin film vapor-phase deposition method, such as a vacuum vapor deposition method, a sputtering method, an ion plating method, a CVD (Chemical Vapor Deposition) method, and an MBE (Molecular Beam Epitaxy) method.

For example, in case of the information recording medium 6 shown in FIG. 3, the reflective layer 8, the first dielectric layer 9, the recording layer 10, and the second dielectric layer 11 are formed sequentially on the substrate 7 using the thin film vapor-phase deposition method, and the optically transparent layer 12 further is formed thereon. The optically transparent layer 12 may be formed by bonding a base member with an adhesive resin applied on one side thereof to a medium on which the layers up to the dielectric layer 11 inclusive have been stacked. Or the optically transparent layer 12 may be formed by bonding a sheet-like base member to a medium on which the layers up to the dielectric layer 11 inclusive have been stacked, using an ultraviolet curable resin. Furthermore, the optically transparent layer 12 may be formed by applying an ultraviolet curable resin on a medium with the layers having been stacked up to the dielectric layer 11 inclusive. The information recording medium shown in FIG. 2, FIG. 4, and FIG. 5 also can be produced by establishing a process of forming each layer constituting the information layers, and a process of forming the interlayers and the optically transparent layers.

Next, an example of the method for recording and reproducing with respect to the information recording medium of the present invention is described.

Figure 6:
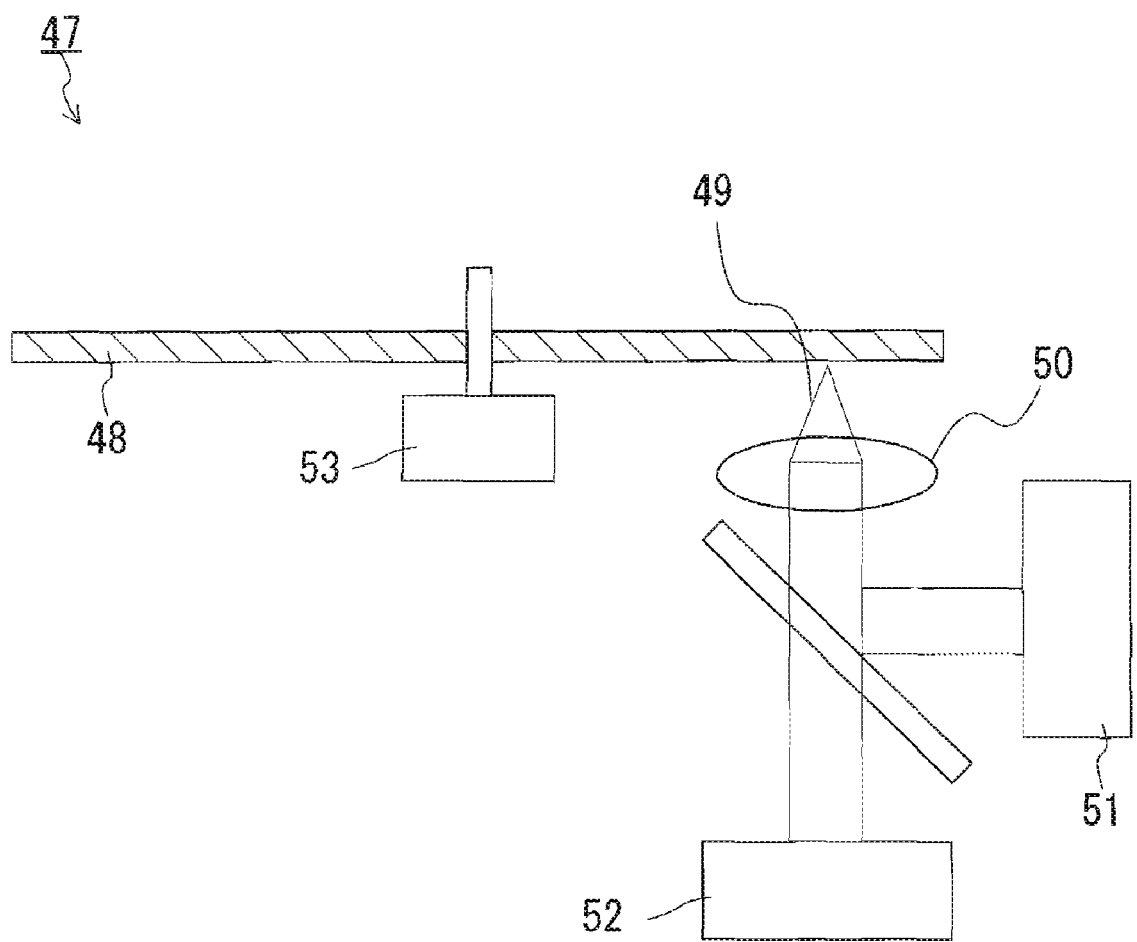
FIG. 6 is a schematic view showing a part of a structure of an example of a recording/reproducing apparatus used for recording and reproducing with respect to the information recording medium of the present invention.

FIG. 6 shows a diagram illustrating an example of the apparatus used for recording and reproducing when the information recording medium is an optical disc. An apparatus 47 used for recording and reproducing signals is provided with an optical head (not shown) having a laser beam source 51 and an object lens 50, a driver (not shown) for guiding an irradiation position of a laser beam 49 to a predetermined position, a tracking controller and a focusing controller (not shown) for controlling positioning in a track direction and in a direction perpendicular to a film surface respectively, a laser driver (not shown) for modulating a laser power, a spindle motor 53 for rotating a medium 48, and a photodetector 52 for reading signals from the medium 48.

Recording and reproducing of signals proceed as follows. First, the medium 48 is rotated by the spindle motor 53, the laser beam is narrowed down to a microspot by an optical system, and then the medium 48 is irradiated with the laser beam 49. Signal reproduction is performed by applying a laser beam at a power level that is lower than that used for recording signals, that does not affect the optical state of recording marks, and that allows to obtain a sufficient amount of light from the medium to reproduce the recording marks when the laser beam is applied, and by reading the signals obtained from the medium at the photodetector 52.

EXAMPLES

Hereinafter, the present invention is described in more detail with reference to examples. The examples below do not limit the present invention.

Example 1

In Example 1, information recording media were prepared having the same layer structure as that of the information recording medium 6 shown in FIG. 3, except that the reflective layer was eliminated.

In the present example, investigation was made for a case where the recording layer composed of a Te—O—Pd material is used, where Pd is used as the element M.

A ZnS—$SiO_2$ dielectric layer with a thickness of 20 nm was formed using a ZnS—$SiO_2$ target, a recording layer with a thickness of 10 nm composed of Te—O—Pd material was formed in an atmosphere of sputtering gas composed of Ar (0 to 50 sccm) and $O_2$ (5 to 50 sccm) using a target composed of Te—Pd, a ZnS—$SiO_2$ dielectric layer with a thickness of 30 nm was formed using a ZnS—$SiO_2$ target, on a 1.2 mm-thick transparent substrate formed of a polycarbonate resin, the substrate having a laser beam guiding groove with a groove pitch of 0.32 μm. These layers were formed in this order by a sputtering method.

An optically transparent layer with a thickness of 100 μm was formed on a surface thereof using an ultraviolet curable resin transparent with respect to the laser beam. By changing the compositions of the targets and the amount of $O_2$ in the sputtering gas, 14 kinds of sample discs (Discs 1 to 14) were prepared in total, each of which had a recording layer of different composition. These discs were prepared in order to investigate the composition dependency of the recording layers. Table 1 shows the results of an elemental analysis on the recording layer of each disc by an X-ray microanalyzer.

A single signal of 12.2 MHz, which is dominant as a signal quality of a random signal, was recorded on the discs 1 to 14 using an optical system having a wavelength of 405 nm and a numerical aperture of NA 0.85, while the discs were being rotated at a linear velocity of 4.9 m/s. Recording was performed on an unrecorded track only one time, and a signal thereof was measured for C/N ratio by a spectrum analyzer. Here, ⊚ indicates that the C/N ratio was at least 43 dB, meaning the signal quality was satisfactory, ○ indicates that the C/N ratio was in a range of 38 to 43 dB, meaning the signal quality was of a usable level, and x indicates that the C/N ratio was less than 38 dB, meaning the signal quality was poor.

An accelerated aging test was conducted on the recorded discs 1 to 14 by leaving them in an environment at a temperature of 90° C. and a relative humidity of 80% for 50 hours. The information recorded on the discs 1 to 14 was reproduced after the accelerated aging test, and an amount of C/N ratio deterioration after the accelerated aging test was measured. Here, ○ indicates that the amount of C/N ratio deterioration was less than 2 dB, meaning the medium had a satisfactory reliability, and x indicates that the amount of C/N ratio deterioration was 2 dB or more, meaning the medium had a poor reliability.

And then, each disc was measured for the transmittance in an unrecorded region and a recorded region by the following method. Specifically, the transmittance in an unrecorded region was measured by a spectroscope, and subsequently, a random signal was recorded on that portion by an evaluation apparatus. The transmittance in the portion where the signal was recorded was measured by the spectroscope, and the transmittance difference between the recorded region and the unrecorded region was calculated. Here, ⊚ indicates that the amount of the transmittance difference was less than 2%, meaning the transmittance balance was satisfactory, ○ indicates that the transmittance difference was in a range of 2 to 5%, meaning the transmittance balance was of a usable level, and x indicates that the transmittance difference was 5% or more, meaning the transmittance balance was poor.

TABLE 1

| Disc No. | Te—O—Pd composition [atom %] | | | Initial C/N ratio | Amount of C/N ratio deterioration after accelerated aging test | Amount of transmittance difference | Overall evaluation |
| --- | --- | --- | --- | --- | --- | --- | --- |
| | Te | O | Pd | | | | |
| 1 | 0 | 30 | 70 | X | X | ○ | X |
| 2 | 0 | 60 | 40 | X | X | ⊚ | X |
| 3 | 5 | 15 | 80 | X | ○ | X | X |
| 4 | 5 | 30 | 65 | ○ | ○ | ○ | ○ |
| 5 | 5 | 45 | 50 | ⊚ | ○ | ⊚ | ⊚ |
| 6 | 5 | 58 | 37 | ⊚ | ○ | ⊚ | ⊚ |
| 7 | 5 | 75 | 20 | ○ | X | ⊚ | X |
| 8 | 15 | 15 | 70 | X | ○ | X | X |
| 9 | 15 | 30 | 55 | ○ | ○ | ○ | ○ |
| 10 | 15 | 45 | 40 | ⊚ | ○ | ⊚ | ⊚ |
| 11 | 15 | 60 | 25 | ○ | ○ | ⊚ | ⊚ |
| 12 | 15 | 75 | 10 | ○ | X | ⊚ | X |
| 13 | 25 | 30 | 45 | X | ○ | ○ | X |
| 14 | 25 | 60 | 15 | X | ○ | ⊚ | X |

According to Table 1, a problem arose in practical use when the amount of Te in the recording layers was less than 1 atom % because Pd—O was dominant and changed in quality during the accelerated aging test, resulting in a deteriorated C/N ratio.

A problem also arose in practical use when the amount of O in the recording layers was more than 70 atom % because the amount of O in the recording layer was excessively large, and Pd—O changed in quality during the accelerated aging test, resulting in a deteriorated C/N ratio.

Moreover, when the amount of O in the recording layers was less than 20 atom %, a problem arose in practical use because the amount of O was excessively small, and thereby the binding of Pd—O, based on which the optical change occurs, was not enough, making the initial C/N ratio low. When the amount of Te in the recording layers was more than 19 atom %, the binding of Te—O became dominant at the time of film forming because the amount of Te was excessively large. As a result, the initial C/N ratio was low because the binding of Pd—O, based on which the optical change occurs, was not enough, causing a problem in practical use.

Therefore, taking into consideration the initial C/N ratio and the amount of C/N ratio deterioration after the accelerated aging test, a composition range is appropriate when the content of Te atom is 1 to 19 atom %, the content of O atom is 20 to 70 atom %, and the content of Pd atom is 11 to 79 atom % in the recording layer. This composition range is indicated as a region enclosed by A, B, C, and D in the composition diagram of FIG. 1.

When the recording layer contains less than 40 atom % of O atom, the amount of the transmittance difference between the recorded region and the unrecorded region is increased in some cases. Therefore, such a recording layer possibly cause a problem in practical use when it is used in a layer on the laser incident side (for example, the second information layer in FIG. 4, and the second information layer to the n-th information layer in FIG. 5) of a multilayer information recording medium.

In order to obtain better properties with regard to the initial C/N ratio, the amount of C/N ratio deterioration after the accelerated aging test, and the amount of the transmittance difference, it is preferable to have a composition range in which the content of Te atom is 1 to 19 atom %, and the content of O atom is 40 to 70 atom %. This composition range is indicated as a region enclosed by E, F, C, and D in the composition diagram of FIG. 1.

In the case where the content of O atom is 40 atom % or more, the content of Pd atom exceeds 35 atom %, and the content of Te atom is 19 atom % or less in the recording layers, a higher initial C/N ratio can be realized.

Therefore, in order to obtain still better properties with regard to the initial C/N ratio, the amount of C/N ratio deterioration after the accelerated aging test, and the amount of the transmittance difference, it is preferable to have a composition range in which the content of Te atom is 1 to 19 atom %, the content of O atom is 40 atom % or more, and the content of Pd atom exceeds 35 atom % in the recording layers. This composition range is indicated as a region enclosed by E, F, G, and H in the composition diagram of FIG. 1.

From the foregoing, the region enclosed by A, B, C, and D in the composition diagram of FIG. 1 is usable for the recording material of all the information layers shown in FIG. 2 to FIG. 5. Especially, the composition ranges indicated as the region enclosed by C, D, E, and F, and the region enclosed by E, F, G, and H are appropriate. As seen, the composition of the region enclosed by A, B, C, and D appropriately can be used for the recording material used for an information layer with which the transmittance difference between a recorded region and an unrecorded region is not a problem, for example, an information layer that is only one information layer provided in the information recording medium (see FIG. 2 and FIG. 3), and an information layer that is disposed farthest from the laser beam incident side (the first information layers shown in FIG. 4 and FIG. 5) among a plurality of information layers.

According to the present example, it has been proved that satisfactory recording properties can be obtained by selecting a material that satisfies a composition range such that the content of Te atom is 1 to 19 atom %, the content of O atom is 20 to 70 atom %, and the content of Pd atom is 11 to 79 atom %, as the composition of the recording layers.

It also has been proved that the transmittance difference between a recorded region and an unrecorded region further can be reduced and a satisfactory initial C/N ratio can be obtained by selecting a material that satisfies a composition range such that the content of Te atom is 1 to 19 atom %, and the content of O atom is 40 to 70 atom %, as the composition of the recording layers.

Furthermore, it has been proved that the transmittance difference between a recorded region and an unrecorded region can be reduced and a better initial C/N ratio can be obtained by selecting a composition range such that the content of Te atom is 1 to 19 atom %, the content of O atom is 40 atom % or more, and the content of Pd atom exceeds 35 atom %, as the composition of the recording layers.

Example 2

In Example 2, information recording media were prepared having the same layer structure as that of the information recording medium 6 shown in FIG. 3, except that the reflective layer was eliminated. The Te—O-M material was used for producing the recording layer, where element M was not Pd as in Example 1, but Ru, Rh, Ag, Re, Os, Ir, Pt, and Au.

A ZnS—SiO$_2$ dielectric layer with a thickness of 20 nm was formed using a ZnS—SiO$_2$ target, a recording layer with a thickness of 10 nm composed of Te—O-M was formed using a target composed of Te-M, where M denotes any of Ru, Rh, Ag, Re, Os, Ir, Pt and Au in the present example, in an atmosphere of sputtering gas of Ar (0 to 50 sccm) and O$_2$ (5 to 50 sccm), and a ZnS—SiO$_2$ dielectric layer with a thickness of 30 nm was formed using a ZnS—SiO$_2$ target, on a 1.2 mm-thick transparent substrate formed of a polycarbonate resin, the substrate having a laser beam guiding groove with a groove pitch of 0.32 μm. These layers were formed in this order by a sputtering method.

An optically transparent layer with a thickness of 100 μm was formed on a surface thereof using an ultraviolet curable resin transparent with respect to the laser beam. By changing the compositions of the targets, 8 kinds of sample discs (Discs 15 to 22) were prepared in total, each of which had a recording layer of different composition. In the recording layer of each disc prepared, the Te:O:M ratio was 5:58:37 (atom %), when measured by the X-ray microanalyzer.

The discs prepared as above were evaluated for the initial C/N ratio, the amount of C/N ratio deterioration after the accelerated aging test, and the amount of the transmittance difference, in the same manner as in Example 1. Table 2 shows the results.

TABLE 2

| Disc No. | Element M | Initial C/N ratio | Amount of C/N ratio deterioration after accelerated aging test | Amount of transmittance difference | Overall evaluation |
| --- | --- | --- | --- | --- | --- |
| 15 | Ru | ◎ | ○ | ◎ | ◎ |
| 16 | Rh | ◎ | ○ | ◎ | ◎ |
| 17 | Ag | ◎ | ○ | ◎ | ◎ |
| 18 | Re | ◎ | ○ | ◎ | ◎ |
| 19 | Os | ◎ | ○ | ◎ | ◎ |
| 20 | Ir | ◎ | ○ | ◎ | ◎ |
| 21 | Pt | ◎ | ○ | ◎ | ◎ |
| 22 | Au | ◎ | ○ | ◎ | ◎ |

As shown in Table 2, it has been proved that when any of Ru, Rh, Ag, Re, Os, Ir, Pt, and Au is used as element M, it is also possible to realize an information layer having a sufficiently high initial C/N ratio, a small amount of C/N ratio deterioration after the accelerated aging test, and a sufficiently small amount of transmittance difference when compared before and after recording. Thus, it has been proved that even when any of Ru, Rh, Ag, Re, Os, Ir, Pt, and Au is used as the element M, excellent properties in respect of the initial C/N ratio, reliability, and transmittance balance can be realized as in the case where Pd is used as the element M.

Example 3

In Example 3, an information recording medium having the same layer structure as that of the information recording medium 1 shown in FIG. 2 was prepared.

A recording layer composed of Te—O—Pd with a thickness of 20 nm was formed using a target composed of Te—Pd, in an atmosphere of sputtering gas of Ar and O$_2$, on a 1.2 mm-thick transparent substrate formed of a polycarbonate resin, the substrate having a laser beam guiding groove with a groove pitch of 0.32 μm. An optically transparent layer with a thickness of 100 μm was formed on a surface thereof using an ultraviolet curable resin transparent with respect to the laser beam (Disc 23). The composition of the recording layer was the same as that of Disc 6 in Example 1.

Disc 23 was evaluated for the initial C/N ratio, the amount of C/N ratio deterioration after the accelerated aging test, and the amount of the transmittance difference, in the same manner as in Example 1.

TABLE 3

| Disc No. | Te—O—Pd composition [atom %] | | | Initial C/N ratio | Amount of C/N ratio deterioration after accelerated aging test | Amount of transmittance difference | Overall evaluation |
| --- | --- | --- | --- | --- | --- | --- | --- |
| | Te | O | Pd | | | | |
| 23 | 5 | 60 | 35 | ○ | ○ | ○ | ○ |

According to Table 3, Disc 23 performed well with respect to the initial C/N ratio, the amount of C/N ratio deterioration after the accelerated aging test, and the amount of the transmittance difference, as Disc 6 did.

A disc having satisfactory properties also was able to be obtained in the present example when the recording layer was formed from the recording material in the compositional conditions that proved satisfactory in Example 1, that is, the material satisfying such a composition range that the content of Te atom is 1 to 19 atom %, the content of O atom is 20 to 70 atom %, and the content of Pd atom is 11 to 79 atom %, by the thin film vapor-phase deposition method.

Example 4

In Example 4, an information recording medium having four stacked information layers was prepared. In other words, the information recording medium 28 shown in FIG. 5, where n=4, was prepared. A sample disc was prepared using Te—O—Pd as the material of the recording layer of each information layer thereof. The sample disc then was evaluated for the initial C/N ratio and environmental reliability (the amount of C/N ratio deterioration after the accelerated aging test) in the same manner as in Example 1.

A polycarbonate resin was used for the substrate. The substrate had a diameter of 12 cm, and a thickness of 1.1 mm, and was provided with a laser beam guiding groove with a groove pitch of 0.32 μm and a groove depth of 20 nm.

On a surface of the substrate on a side on which the guiding groove was formed, an Ag—Pd—Cu reflective layer with a thickness of 80 nm was formed using an Ag—Pd—Cu (Ag:Pd:Cu=98.1:0.9:1.0 (weight ratio)) target, a ZnO dielectric layer with a thickness of 20 nm was formed using a ZnO target, a recording layer composed of Te—O—Pd with a thickness of 20 nm was formed using a target composed of Te—Pd, and a ZnS—SiO$_2$ dielectric layer with a thickness of 30 nm was formed using a ZnS—SiO$_2$ (ZnS:SiO$_2$=80:20 (ratio of the number of molecules)) target. These layers were formed in this order by a sputtering method to serve as the first information layer. On the first information layer thus formed (specifically on the ZnS—SiO$_2$ dielectric layer), an interlayer with a thickness of approximately 13.5 μm having the same groove patterns as that on the substrate transferred, was formed using an ultraviolet curable resin.

On a surface of the interlayer formed on the first information layer as mentioned above, an AlN dielectric layer with a thickness of 15 nm was formed using an AlN target, a recording layer with a thickness of 11 nm composed of Te—O—Pd was formed using a Te—Pd target, and a ZnS—SiO$_2$ dielectric layer with a thickness of 22 nm was formed using a ZnS—SiO$_2$ (ZnS:SiO$_2$=80:20 (ratio of the number of molecules)) target. These layers were formed in this order by a sputtering method to serve as the second information layer. On the second information layer thus formed (specifically on the ZnS—SiO$_2$ dielectric layer), an interlayer with a thickness of approximately 17.5 μm having the same groove patterns as that on the substrate transferred was formed using an ultraviolet curable resin.

On a surface of the interlayer formed on the second information layer, an AlN dielectric layer with a thickness of 10 nm was formed using an AlN target, a recording layer with a thickness of 7 nm composed of Te—O—Pd was formed using a Te—Pd target, and a ZnS—SiO$_2$ dielectric layer with a thickness of 34 nm was formed using a ZnS—SiO$_2$ (ZnS:SiO$_2$=80:20 (ratio of the number of molecules)) target. These layers were formed in this order by a sputtering method to serve as the third information layer. On the third information layer thus formed (specifically on the ZnS—SiO$_2$ dielectric layer), an interlayer with a thickness of approximately 9.5 μm having the same groove patterns as that on the substrate transferred was formed using an ultraviolet curable resin.

On a surface of the interlayer formed on the third information layer, an AlN dielectric layer with a thickness of 10 nm was formed using an AlN target, a recording layer with a thickness of 6 nm composed of Te—O—Pd was formed using a Te—Pd target, and a ZnS—SiO$_2$ dielectric layer with a thickness of 45 nm was formed using a ZnS—SiO$_2$ (ZnS:SiO$_2$=80:20 (ratio of the number of molecules)) target. These layers were formed in this order by a sputtering method to serve as the fourth information layer. On the fourth information layer thus formed (specifically on the ZnS—SiO$_2$ dielectric layer), an optically transparent layer with a thickness of approximately 59.5 μm was formed using an ultraviolet curable resin.

Each layer was formed using a target with a diameter of approximately 100 mm and a thickness of approximately 6 mm. The reflective layers were formed at a DC power of 200 W. The dielectric layers were formed at an RF power of 300 W. The recording layers were formed at an RF power of 100 W. The reflective layers were formed in an atmosphere where Ar gas of 4.2×10$^{-7}$ m$^3$/S (25 sccm) was maintained at a pressure of approximately 0.13 Pa. The recording layers were formed in an atmosphere where a mixture of Ar gas of 4.2×10$^{-7}$ m$^3$/S (25 sccm) and an appropriate amount of oxygen gas was maintained at a pressure of approximately 0.13 Pa. The dielectric layers were formed in an atmosphere where Ar gas of 4.2×10$^{-7}$ m$^3$/S (25 sccm) was maintained at a pressure of approximately 0.13 Pa.

The composition ratio of the recording layer in each information layer formed in the present example was Te:O:Pd=5:45:50 (atom %) in the first information layer and the second information layer, and Te:O:Pd=5:58:37 (atom %) in the third information layer and the fourth information layer, as shown in Table 4.

Disc 24 thus prepared was evaluated for the initial C/N ratio and the amount of C/N ratio deterioration after the accelerated aging test in the same manner as in Example 1. It should be noted that four information layers were provided in the present example. And at the time of evaluating each information layer, the other information layers had no information recorded. For example, when the C/N ratio of the first information layer was evaluated, the second information layer, the third information layer, and the fourth information layer had no information recorded.

In the present example, with regard to the initial C/N ratio, ○ indicates more than 38 dB, meaning signal quality was satisfactory, and x indicates less than 38 dB, meaning signal quality was poor. With regard to the amount of C/N ratio deterioration after the accelerated aging test, ○ indicates less than 2 dB, meaning the medium had a satisfactory reliability, and x indicates 2 dB or more, meaning the medium had a poor reliability.

TABLE 4

| Disc No./Location of information layer | Te—O—Pd composition [atom %] | | | Initial C/N ratio | Amount of C/N ratio deterioration after accelerated aging test | Overall evaluation |
| --- | --- | --- | --- | --- | --- | --- |
| | Te | O | Pd | | | |
| 24 First information layer | 5 | 45 | 50 | ○ | ○ | ○ |
| Second information layer | 5 | 45 | 50 | ○ | ○ | ○ |
| Third information layer | 5 | 58 | 37 | ○ | ○ | ○ |
| Fourth information layer | 5 | 58 | 37 | ○ | ○ | ○ |

As shown in Table 4, it has been proved that Disc 24 of the present example can realize a satisfactory initial C/N ratio and reproduction durability. In the present example, the effect of the present invention was investigated using a material having a composition ratio of Te:O:Pd=5:45:50 (atom %) and a material having a composition ratio of Te:O:Pd=5:58:37 (atom %) as the material used for the recording layers in the information recording medium of the present invention. It also has been proved that satisfactory properties can be obtained as in case of Disc 24 even when other compositions are used within the region enclosed by A, B, C, and D in the composition diagram shown in FIG. 1.

From the results above, it has been proved that a four-layer information recording medium that exhibits satisfactory signal quality can be realized by selecting a material satisfying such a composition range that the content of Te atom is 1 to 19 atom %, the content of O atom is 20 to 70 atom %, and the content of M atom is 11 to 79 atom %, as the material of the recording layers.

INDUSTRIAL APPLICABILITY

The information recording medium of the present invention and the method for production thereof can reduce the transmittance difference between a recorded region and an unrecorded region in information layers, and further reduce the production cost of the information layers. Therefore, the information recording medium of the present invention and the method for production thereof are useful to obtain information recording media, especially multilayer information recording media, with satisfactory recording and reproducing properties at low cost.

The invention claimed is:

1. An information recording medium on and from which information is recorded and reproduced by being irradiated with a laser beam, the information recording medium comprising:

a substrate; and an information layer including a recording layer, wherein the recording layer comprises, as its main component, a material composed of Te, O, and M, where M denotes at least one element selected from the group consisting of Ru, Rh, Pd, Ag, Re, Os, Ir, Pt, and Au, and wherein a content of Te atom is 1 to 19 atom %, a content of O atom is 40 to 70 atom %, and a content of M atom exceeds 35 atom % but does not exceed 59 atom % in the material.

2. The information recording medium according to claim 1, wherein the information layer further comprises a dielectric layer disposed adjacent to the recording layer.

3. The information recording medium according to claim 1, wherein the information layer further comprises a reflective layer disposed on a side opposite to a laser beam incident side with respect to the recording layer.

4. The information recording medium according to claim 1, wherein the recording layer has a thickness of 3 nm to 200 nm.

5. The information recording medium according to claim 1, wherein a first information layer to an n-th information layer (where n is an integer of at least 2) are stacked on the substrate in this order with a separation layer interposed between each of the information layers, and at least one selected from the first information layer to the n-th information layer includes the recording layer.

6. A method for producing the information recording medium according to claim 1, comprising a step of forming the information layer, wherein the recording layer is formed by a thin film vapor-phase deposition method in the step.

* * * * *